United States Patent Office 2,913,305
Patented Nov. 17, 1959

2,913,305
PROCESS FOR CORROSION INHIBITION

Donald L. Andersen, Minneapolis, Minn., assignor to General Mills, Inc., a corporation of Delaware No Drawing. Application February 21, 1957
Serial No. 641,468

2 Claims. (Cl. 21—2.7)

This invention relates to a new and useful method for protecting metallic substances from corrosive action when in contact with an aqueous medium. More specifically, it relates to the use of organic acid salts of polymeric fat amines as corrosion inhibitors.

Corrosion of metallic substances represents a major industrial problem. Every year the loss to industry through corrosion amounts to millions of dollars. Ferrous metals are generally associated with this problem, however, copper, brass, and aluminum are also effected to a lesser degree. In general, corrosion takes place when the metallic substance comes in contact with a watery medium, i.e. water vapor, water, water and oil emulsions, solutions and so forth.

It has now been discovered that polymeric fat amine and its salts are exceptionally good corrosion inhibitors and are especially useful against ferrous metals in the presence of oil and aqueous phases. As such, they may be utilized as corrosion inhibitors in the chemical process industries, oil refining and processing equipment, in the protection of pipelines. Other illustrative applications are additives for protective coatings, industrial water treatment, and as a mineral acid inhibition additive.

Polymeric fat acids are well-known commercially available acids and the polymeric fat amines used in this invention have essentially the same structure except that the carboxyl groups have been replaced by amine groups. As such they may be prepared directly from polymeric fat acids by reacting these acids with ammonia to produce the corresponding nitrile and subsequently hydrogenating the nitrile to the corresponding amine. Likewise, it is possible to prepare similar polymeric fat amines by the polymerization of suitable fatty amines, by the polymerization of suitable fatty nitriles followed by hydrogenation of the polymeric fat nitrile to the polymeric fat amine, and by the polymerization of suitable fatty amides to polymeric fatty amides, reaction of the polymeric fatty amide with ammonia to get the corresponding polymeric fat nitriles, and hydrogenation of the polymeric fat nitrile to the corresponding polymeric fat amine.

In any case the basic raw materials for the preparation of the polymeric fat amines are fatty acids having sufficient double bond functionality to form the polymeric material. An ideal starting material would be pure linoleic acid. It will be appreciated, however, that the acids employed occur in nature as complex mixtures and isolation of pure linoleic acid is as a practical matter commercially unfeasible. Instead sources rich in linoleic acid (30 to 80%) are employed as the starting acids. One analytical method for describing mixtures of fatty acids having sufficient double bond functionality is by reference to its iodine number i.e., the number of grams of iodine equivalent to the halogen absorbed by a 100 gram sample. Generally speaking acids having an iodine number of at least 120 will have sufficient double bond functionality to form the desired polymer. Illustrative sources of suitable acids are soybean, linseed, tung, perilla, cottonseed, corn, sunflower, safflower, and dehydrated castor oil as well as tall oil and soapstock. Furthermore, linoleic acid rich fatty acids may be obtained from these various sources by crystallization and/or distillation.

The polymeric fat amines employed in this invention contain a preponderance of dimer amine in admixture with some trimers and higher polymers as well as some monomeric amine. The accepted formula for the dimer is as follows:

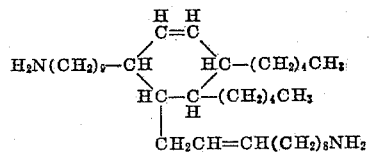

Any organic acid may be employed to prepare salts of the polymeric fat amines. It is, however, desirable that the acids should contain at least 4 carbon atoms, since at high concentrations the presence of acetate and propionate radicals has been known to promote corrosion and serve to mitigate the effectiveness of the polymeric fat amine as a corrosion inhibitor. Illustrative acids are capric, undecylic, lauric, myristic, palmitic, stearic, arachidic acid, acrylic, sorbic, oleic, linoleic, linolenic acids, hydroxy stearic, di and tri hydroxy stearic, ricinoleic acids, alkyl malonic acid, alkyl succinic acid, alkyl glutaric acid, glycolic acid, pyruoic, phthalonic acid, lactic acid, alkyl maleic acid, alkyl malic acid, alkyl tartaric acid, alkyl citric acid, keto acids, suberic acid, alkyladipic acid, tartronic acid, and the like acids produced by oxidation of hydrocarbon, e.g. paraffin wax and the like. Benzoic, salicylic, cinnamic, hydrocinnamic, phthalic, naphthoic, abietic, naphthenic and sulfonic acids derived from petroleum hydrocarbons, mandelic acid, and the like, phenyl acetic acid, phenyl stearic acid, naphthyl stearic acid, and resinic acid are the illustrative aromatic acids.

This invention may be illustrated further by reference to the following examples in which all "parts" are expressed as parts by weight and all "percentages" are expressed as percent by weight, unless specified otherwise.

*Example I*

The lauric acid salt of a polymeric fat amine prepared by reacting polymeric fat acids containing a preponderance of dilinoleic acid with ammonia to obtain the corresponsing polymeric fat nitrile and hydrogenation of the nitrile groups to amine groups was tested for its effectiveness as a corrosion inhibitor in a static water drop test. This test is a qualitative visual observation of the rusting of a #1020 mild steel coupon by the action of a water drop placed in an indentation of the coupon immersed in a static oil system for 48 hours. In this test a drop containing 0.05% by weight of the lauric acid salt was observed to inhibit corrosion completely whereas without the additive the coupon was heavily rusted.

*Example II*

Tests similar to the one described in Example I were run where the acids employed to form the salt of the polymeric fat amines were valeric, caproic, caprylic, capric, lauric, stearic, oleic, polymeric fat acids, glycolic, and maleic. In each instance 0.05% by weight of the salt was added to the water and they were all observed to inhibit corrosion completely.

*Example III*

The oleic acid salt of polymeric fat amine was tested in a dynamic system as a corrosion inhibitor. In this test a #1020 mild steel cylinder was suspended in a system of 9 parts oil and 1 part water, stirred at 1000 r.p.m., and maintained at a temperature of 140° F. for 24 hours. Upon the addition of 0.01% by weight of this salt to the system, no rusting of the cylinder was visible whereas in the absence of the additive the cylinder was heavily rusted.

*Example IV*

The oleic and stearic acid salts of a polymeric fat amine prepared as shown in Example I were tested quantitavely as corrosion inhibitors. In these tests a #1020 mild steel coupon was immersed in a static sour brine-kerosene system for 7 days and the loss in weight determined.

Addition of 40 parts per million (p.p.m.) of the stearic acid salt to the system resulted in 93.4% inhibition of the weight loss due to rust. Addition of 60 p.p.m. of the oleic acid salt resulted in an inhibition of 90.1%. The uninhibited control (no dimeric salt added) evidenced a loss in weight of the coupon of 35.0 mg. as 0.5% by weight.

*Example V*

The free dimer amine when tested by the method described in Example IV at concentrations of 10 and 75 p.p.m. gave 85% and 94.9%, respectively.

Many modifications and variations of this invention as hereinbefore set forth may be made without departing from the spirit and scope thereof, and therefore only such limitations should be imposed as are indicated in the appended claims.

I claim as my invention:

1. A process for corrosion inhibition of ferrous metallic substances contacted by oil and aqueous media which comprises contacting said substances with a compound selected from the group consisting of polyamines having structures corresponding to the structure of polymeric fat acids save that the polyamines have amine groups in place of the carboxyl groups of the polymeric fat acids, and salts of said polyamines with fatty acids containing at least four carbon atoms.

2. The process of claim 1 in which the fatty acid contains a free hydroxyl group.

References Cited in the file of this patent

UNITED STATES PATENTS

| | | |
|---|---|---|
| 2,126,173 | Clapsadle | Aug. 9, 1938 |
| 2,334,158 | Von Fuchs et al. | Nov. 9, 1943 |
| 2,614,980 | Lytle | Oct. 21, 1952 |
| 2,646,399 | Hughes | July 21, 1953 |
| 2,718,503 | Rocchini | Sept. 20, 1955 |
| 2,785,078 | Keating | Mar. 12, 1957 |